(12) United States Patent
Gatton et al.

(10) Patent No.: US 7,226,250 B2
(45) Date of Patent: Jun. 5, 2007

(54) TOOL AND METHOD FOR FORMING A LUG HOLE

(75) Inventors: Geoffrey L. Gatton, Farmington, MI (US); Dave Seiler, Fort Wayne, IN (US)

(73) Assignee: Hayes Lemmerz International, Inc., Northville, MI (US)

( * ) Notice: Subject to any disclaimer, the term of this patent is extended or adjusted under 35 U.S.C. 154(b) by 233 days.

(21) Appl. No.: 10/744,118

(22) Filed: Dec. 22, 2003

(65) Prior Publication Data

US 2005/0135885 A1  Jun. 23, 2005

(51) Int. Cl.
*B23B 51/02* (2006.01)
*B23B 51/08* (2006.01)

(52) U.S. Cl. .......................... 408/1 R; 408/22; 408/26; 408/224; 408/713

(58) Field of Classification Search ............... 408/1 R, 408/22, 26, 30, 24, 223, 224, 225, 227, 233, 408/713

See application file for complete search history.

(56) References Cited

U.S. PATENT DOCUMENTS

| | | | |
|---|---|---|---|
| 1,176,950 A * | 3/1916 | Foltz | 408/171 |
| 1,576,794 A * | 3/1926 | Sasse | 408/224 |
| 2,400,856 A * | 5/1946 | Thompson | 408/233 |
| 2,899,851 A * | 8/1959 | Grobecker | 408/25 |
| 4,060,335 A * | 11/1977 | Holloway et al. | 408/233 |
| 4,115,024 A * | 9/1978 | Sussmuth | 407/114 |
| 4,165,200 A | 8/1979 | Taylor | |
| 4,265,574 A | 5/1981 | Eckle | |
| 4,333,727 A | 6/1982 | Bennett | |
| 4,355,932 A * | 10/1982 | Koppelmann et al. | 408/188 |
| 4,531,867 A * | 7/1985 | Benhase | 408/229 |
| 4,533,285 A * | 8/1985 | Jorgensen | 408/191 |
| 4,563,113 A * | 1/1986 | Ebenhoch | 408/223 |
| 4,831,674 A * | 5/1989 | Bergstrom et al. | 470/199 |
| 4,844,669 A | 7/1989 | Tsujimura et al. | |
| 5,145,018 A * | 9/1992 | Schimke et al. | 175/385 |
| 5,173,013 A * | 12/1992 | Gorse et al. | 408/22 |
| 5,176,477 A * | 1/1993 | Noggle | 408/59 |
| 5,186,584 A * | 2/1993 | Muller et al. | 408/26 |
| 5,288,184 A | 2/1994 | Heule | |
| 5,474,407 A * | 12/1995 | Rodel et al. | 408/227 |
| 5,609,446 A * | 3/1997 | Link et al. | 408/224 |
| 5,733,078 A * | 3/1998 | Matsushita et al. | 409/74 |
| 5,803,679 A | 9/1998 | Heule | |
| 5,816,753 A * | 10/1998 | Hall | 408/224 |
| 5,863,161 A * | 1/1999 | Tayne et al. | 408/224 |
| 5,957,633 A * | 9/1999 | Hall | 408/187 |

(Continued)

FOREIGN PATENT DOCUMENTS

DE    3318204 A1 *   3/1984

(Continued)

*Primary Examiner*—Monica Carter
*Assistant Examiner*—Michael W. Talbot
(74) *Attorney, Agent, or Firm*—MacMillan, Sobanski & Todd, LLC

(57) ABSTRACT

A single tool that provides multiple machining operations for forming a lug hole through a vehicle wheel hub includes an end portion having a first diameter and a mid-portion having a second diameter that is greater than the first diameter. A spade drill bit is mounted upon the end portion and a bore cutting tool is mounted upon the mid-portion.

14 Claims, 10 Drawing Sheets

U.S. PATENT DOCUMENTS

| | | | | |
|---|---|---|---|---|
| 6,033,161 | A | * | 3/2000 | Scheufler, Jr. ............... 408/201 |
| 6,200,078 | B1 | * | 3/2001 | Kubota ......................... 409/74 |
| 6,224,302 | B1 | * | 5/2001 | Cole ........................... 408/224 |
| 6,379,088 | B1 | * | 4/2002 | Gruber et al. ............. 408/83.5 |
| 6,984,094 | B2 | * | 1/2006 | Nuzzi et al. ................ 408/224 |
| 2004/0018064 | A1 | * | 1/2004 | Liu ............................. 408/224 |

FOREIGN PATENT DOCUMENTS

| | | | | |
|---|---|---|---|---|
| DE | 3610016 | A1 | * | 10/1987 |
| DE | 4010075 | A1 | * | 10/1991 |
| JP | 63185507 | A | * | 8/1988 |
| JP | 05162010 | A | * | 6/1993 |
| JP | 2004283933 | A | * | 10/2004 |
| JP | 2005022003 | A | * | 1/2005 |
| JP | 2005138258 | A | * | 6/2005 |

\* cited by examiner

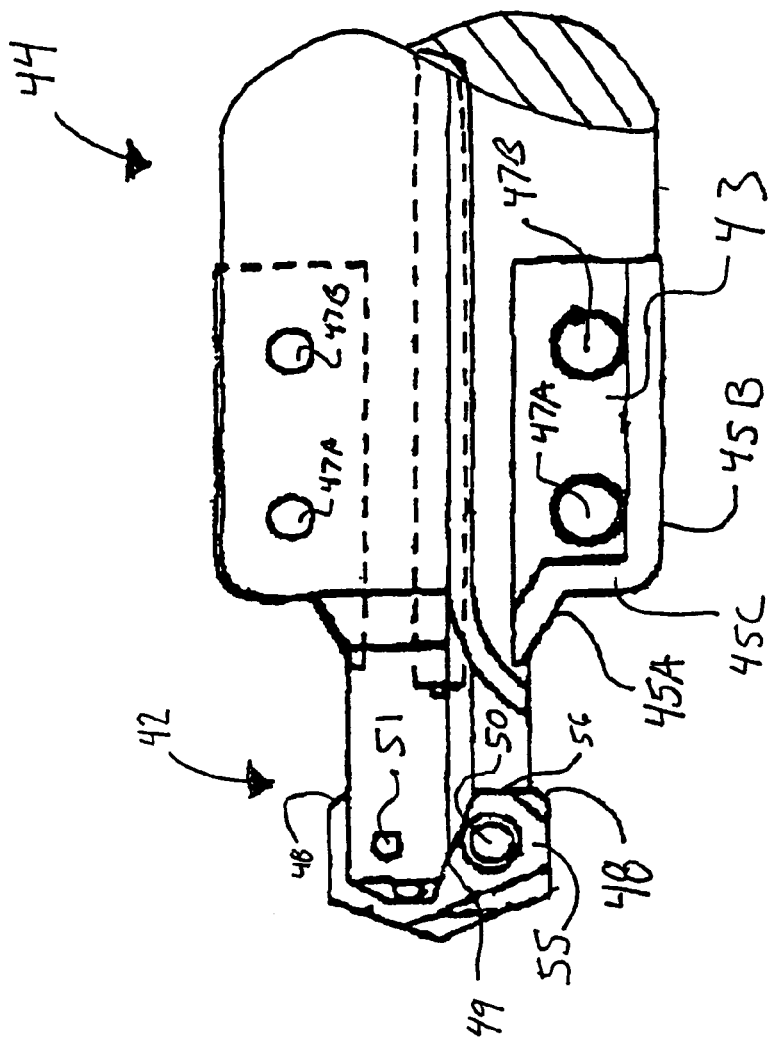
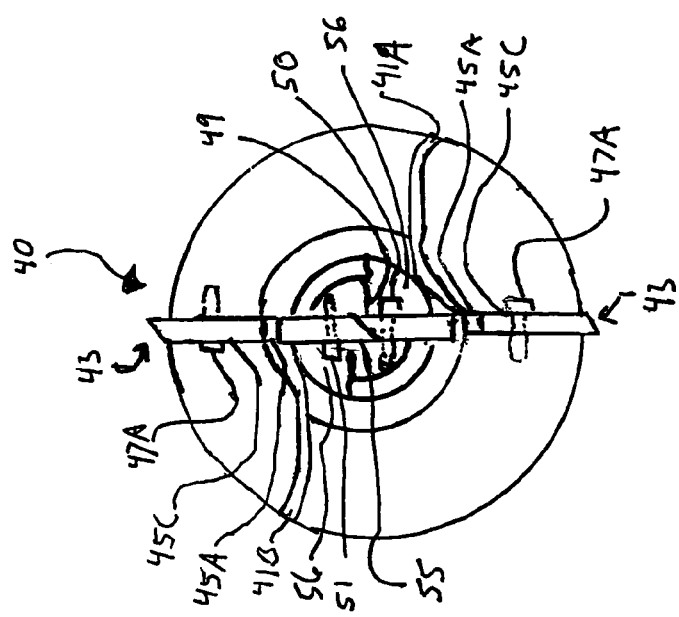
FIG. 4B
FIG. 4A

TOOL AND METHOD FOR FORMING A LUG HOLE

BACKGROUND OF INVENTION

This invention relates in general to the manufacture of vehicle wheels and in particular to a tool and method for forming lug holes through a vehicle wheel hub.

Vehicle wheels include an annular wheel rim that supports a pneumatic tire. A wheel disc typically extends across the outboard end of the wheel rim and is formed having a pleasing esthetic shape. The wheel disc usually includes a central wheel hub supported within the wheel rim by a plurality of radial spokes. Apertures formed through the wheel hub allow attachment to a vehicle axle.

Light weight vehicle wheels cast from alloys of aluminum, magnesium, and titanium have become increasingly popular. Such wheels may be cast as one piece and then finished with a number of machining operations or assembled from several components that also are machined to final dimensions. Regardless of the method used, the manufacture of vehicle wheels is highly automated.

One of the steps that are required to manufacture a vehicle wheel is the forming of a plurality of lug holes through the hub of the vehicle wheel. When a vehicle wheel is mounted upon an axle, a plurality of lug bolts extending from an axle hub are received by corresponding lug holes in the wheel hub. A chamfer formed at the inboard end each lug hole guides the end of each of the lug bolts into the respective lug hole. Each of the lug bolts cooperate with a corresponding lug nut, that is seated upon a conical seat formed at the outboard end of each lug hole, to secure the vehicle wheel to the wheel hub.

Referring now to the drawings, a typical lug hole 10 is illustrated in FIG. 1 that extends through a hub portion 12 of a vehicle wheel, as shown in section. The lug hole 10 extends from an outboard surface 16 through the wheel hub 12 and to an inboard surface 18. As also shown in FIG. 1, the lug hole 10 includes an outboard end counterbore 22 that receives the lug nut (not shown). A conical seat 26 is formed in the base of the counterbore 22. The lug hole 10 further includes a circular recess 20 formed at the inboard end of the lug hole 10 that receives a nut, such as a Tinnerman® nut (not shown). A chamfer portion 24 is formed in the base of the circular recess 20 of the lug hole 10. A lug hole land 28 extends between the chamfer portion 24 and the conical seat 26. A lug bolt 29 disposed in the lug hole 10 is outlined with dashed lines.

The lug hole 10 is formed with a highly automated process that is illustrated by the flow chart shown in FIG. 2. The various tools used to form the lug hole 10 are mounted upon a multiple tool drilling head in a wheel drilling machine. The process begins in functional block 30 with the wheel being clamped upon a wheel drilling machine jig with the outboard end facing the multiple tool drilling head. Typically, when the wheel is formed, the circular recess 20 is cast integrally to the wheel. Alternatively, the circular recess 20 may be machined before the wheel is clamped upon the wheel drilling machine jig for forming the lug hole 10. In functional block 31, a pilot hole for a lug hole is drilled through the wheel hub with a spiral twist drill. Drilling the pilot hole also forms the lug hole land 28. The wheel is then indexed and additional lug hole lands are drilled. In a similar manner, the wheel is indexed after each of the following operations to permit repeating the specific operation for each lug hole. Next, the outboard end of the lug hole 10 is counterbored with a counterbore tool in functional block 32. A countersink is used in functional block 34 to form the conical seat 26 in the base of the counterbore 22. Then a reamer is used in functional block 35 to polish the wall of the counterbore 22. The wheel is then rotated 180 degrees upon the wheel jig in functional block 36 to expose the inboard surface of the disc to the multiple tool drilling head. Finally, in functional block 38 the chamfer portion 24 is formed in the base of the circular recess 20 by using a chamfer tool.

As described above, the process for forming a lug hole requires numerous machining operations and a number of different tools. Because a vehicle wheel typically includes five lug holes, it is apparent that a great deal of time and effort is required to form the lug holes. Accordingly, it would be desirable to reduce the number of machining operations and the number of tools to reduce both the time required to finish a wheel and the number of different tools that must be carried in inventory at the manufacturing facility.

SUMMARY OF INVENTION

This invention relates to a single tool and method for using the tool to form lug holes through a vehicle wheel disc.

The present invention contemplates a single tool for forming a lug hole through the disc of a vehicle wheel that includes a stepped cylindrical base that includes an end portion having a first diameter and a mid-portion having a second diameter that is greater than the first diameter. The tool also includes a spade drill bit mounted upon the end portion that has a width that is greater than the first diameter and at least one bore cutting tool mounted upon the mid-portion of the base.

The invention also contemplates a method for forming a lug hole with the above tool that includes drilling a pilot hole through a wheel disc with the spade drill bit, the mid-portion of the tool forming a counterbore in one end of the pilot hole. The tool is then rotating and moving the tool in a radial direction within the pilot hole to offset the tool from that axis of the pilot hole. Finally, while the tool continues to rotate, it is moved in a circular arc opposite to the rotation of the tool to enlarge the counterbore to a final diameter with a climb cutting operation.

Various objects and advantages of this invention will become apparent to those skilled in the art from the following detailed description of the preferred embodiment, when read in light of the accompanying drawings.

BRIEF DESCRIPTION OF DRAWINGS

FIG. 4A is an enlarged end view of the cutting end of the tool shown in FIG. 3.

FIG. 4B is an enlarged partial side view of the cutting end of the tool shown in FIG. 3.

DETAILED DESCRIPTION

Figure 1:
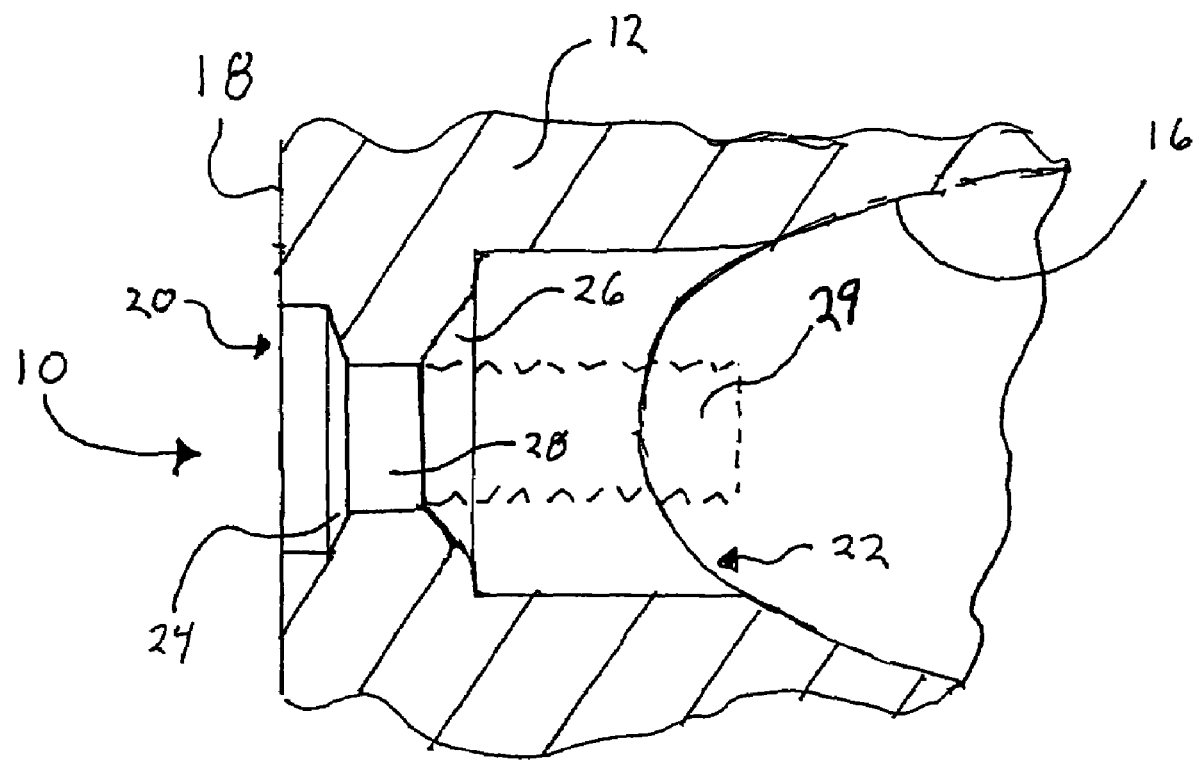
FIG. 1 is sectional view of a portion of a vehicle wheel disc hub that includes a lug hole.
Figure 2:
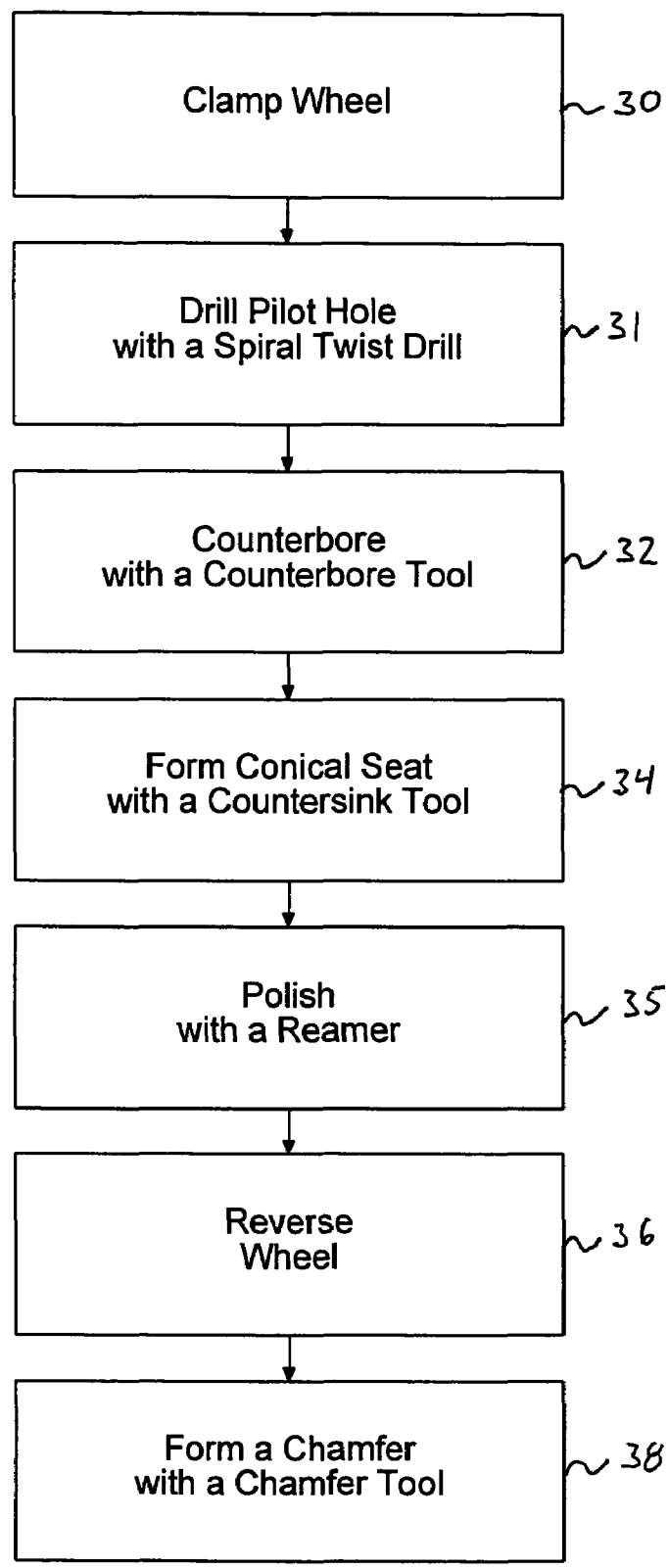
FIG. 2 is a flow chart illustrating a known method for forming the lug hole shown in FIG. 1.
Figure 3:
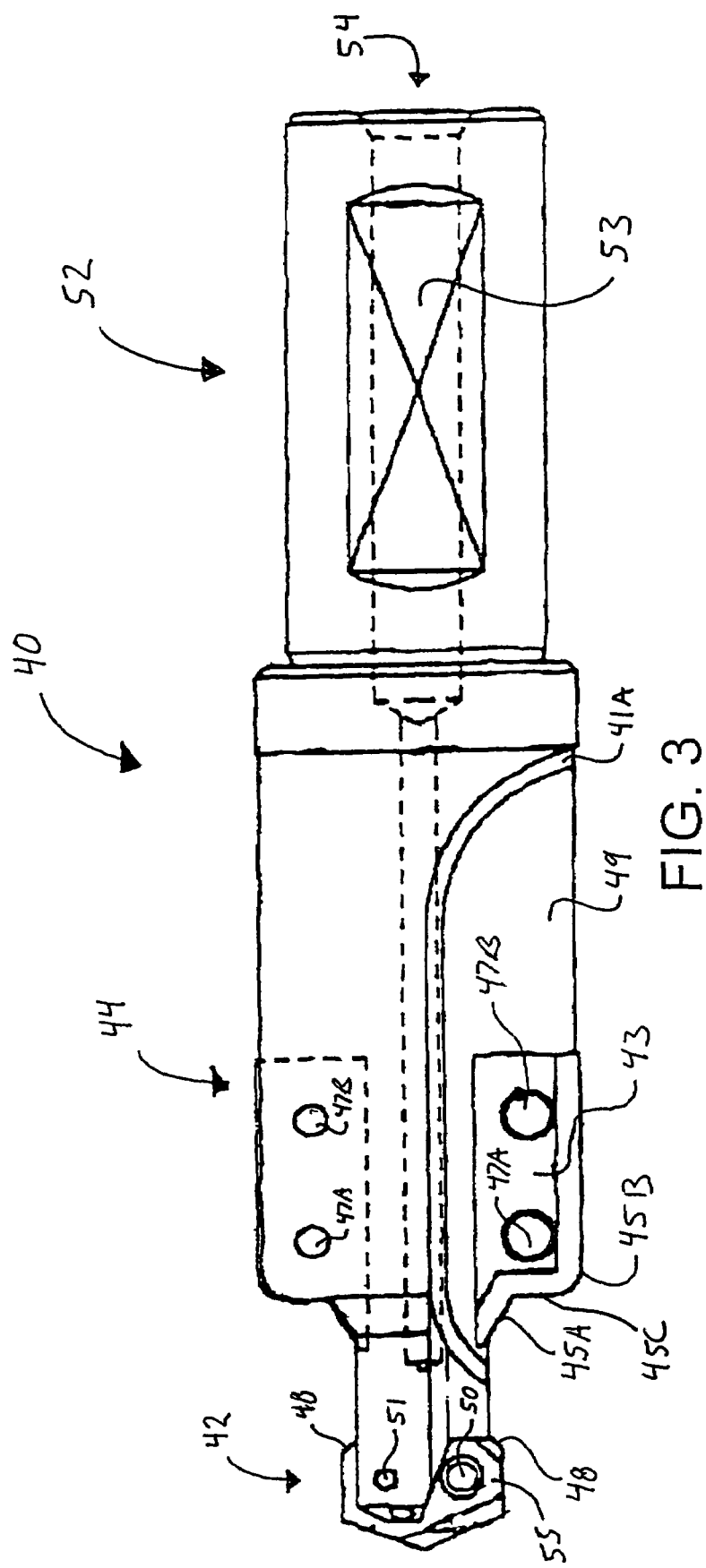
FIG. 3 is drawing of a single tool for forming a lug hole that is in accordance with the present invention.

Referring again to the drawings, there is illustrated generally at 40 in FIG. 3, a single tool for forming a lug hole through a vehicle wheel disc hub that is in accordance with the invention. An enlarged end view of the cutting end of the tool 40 is shown in FIG. 4A and an enlargement of a side view of the cutting end of the tool 40 is shown in FIG. 4B. In the preferred embodiment, the tool 40 is formed from carbide. As best seen in FIG. 4B, the tool 40 includes an end portion 42 having a reduced diameter that extends axially from a mid-portion 44. The end portion 42 carries a removable spade drill bit 55. A slot 49 formed in the end portion 42 receives the spade drill bit 55.

Additionally, two notches 56 are formed in opposite sides of the tool end portion 42 to allow the spade drill bit 55 to be fastened to the end portion 42 by a pair of threaded fasteners, preferably by TORX® screws, 50 and 51. The use of threaded fasteners allows for easy replacement of a damaged spade drill bit 55. Furthermore, the use of threaded fasteners allows for easy removal and replacement of the spade drill bit 55 during service, to allow for sharpening of the cutting surfaces. As shown in FIGS. 3, 4A, and 4B, the width of the spade bit 55 is greater than the diameter of the tool end portion 42.

The spade drill bit 55 also includes a pair of chamfer cutting edges 48 formed on the reverse end of the spade drill bit 55 that extend beyond the surface of the tool end portion 42. As will be explained below, the chamfer cutting edges 48 are used to form the chamfer portion 24 on the inboard end of the lug hole 10. In the preferred embodiment, the cutting surfaces of the spade drill bit 55 are angled at 135 degrees from the axis of the tool 40; however, the invention contemplates that the cutting surfaces may have any suitable angle. Also, the spade drill bit 55 has a total width that corresponds to the diameter of the lug hole land 28 formed in the lug hole 10. Accordingly, the width of the spade dill bit 55 is selected to provide the desired diameter of the lug hole land 28.

The tool 40 further includes the generally cylindrically shaped mid-portion 44. As shown in FIGS. 3, 4A, and 4B, the mid-portion 44 has a greater diameter than the width of the spade drill bit 55. As best seen in FIGS. 4A and 4B, the mid-portion 44 includes a first axially extending recesses 41A and a second axially extending recess 41B that is opposite from the first recess 41A. Each of the recesses includes a generally flat surface extending along a portion of a chord of the mid-portion 44. A pair of cutting tools 43 are oppositely mounted upon the flat surfaces within each of the recesses 41A and 41B. As will be explained below, the cutting tools 43 are used to form the counterbore 22 and the conical seat 26 of the lug hole 10.

Each cutting tool 43 includes a first cutting edges 45A that is formed at the left end of the tool in FIG. 3 and extends radially at an angle to the axis of the tool 40 from a conic section. As will be explained below, each of the first cutting edges 45A cut into the wheel outboard surface 16 as the tool 40 is advanced in an axial direction into the wheel disc hub 12. As the tool 40 advances, the cutting edges begin forming the larger diameter counterbore that receives a lug nut. Additionally, the first cutting edges 45A also form the countersunk outboard end of the lug hole land 28 that provides the conical seat 26 for the lug nut. Additionally, each cutting tool 43 also includes a second cutting edge 45B that is formed along the outer edge of the tool and extends longitudinally along the edges of the mid-portion 44. As will be explained below, the second cutting edges 45B ream the primary cut of the sides of the lug hole counterbore 22 with a milling type machining operation. In the preferred embodiment, climb cutting is utilized to enlarge and polish the counterbore 22. A third cutting edge 45C extends in a radial direction between the first and second cutting edges 45A and 45B. The third cutting edge 45C functions to cut the base of the counterbore 22 into the wheel disc hub 12.

Each of the cutting tools 43 is fastened to the tool mid-portion 44 by a pair of fasteners, preferably by TORX® screws 47A and 47B. As above, the use of threaded fasteners, such as TORX® screws, allows for easy replacement of damaged cutting tools 43. Further, the use of threaded fasteners allows for easy removal and replacement of the cutting tools 43 during service, to allow for sharpening of the cutting edges.

The tool 40 also includes a shank portion 52. A pair of flats 53 (one shown) are formed in the shank portion 52 of the tool 40 to facilitate mounting the tool 40 upon a Computer Numerical Control (CNC) machining station, or a wheel drilling machine. The tool 40 preferably further includes an axial vent 54 (as indicated in FIG. 3 by dashed lines). The vent 54 allows heat to escape or aids cooling with the circulation of a coolant fluid.

Figure 5:
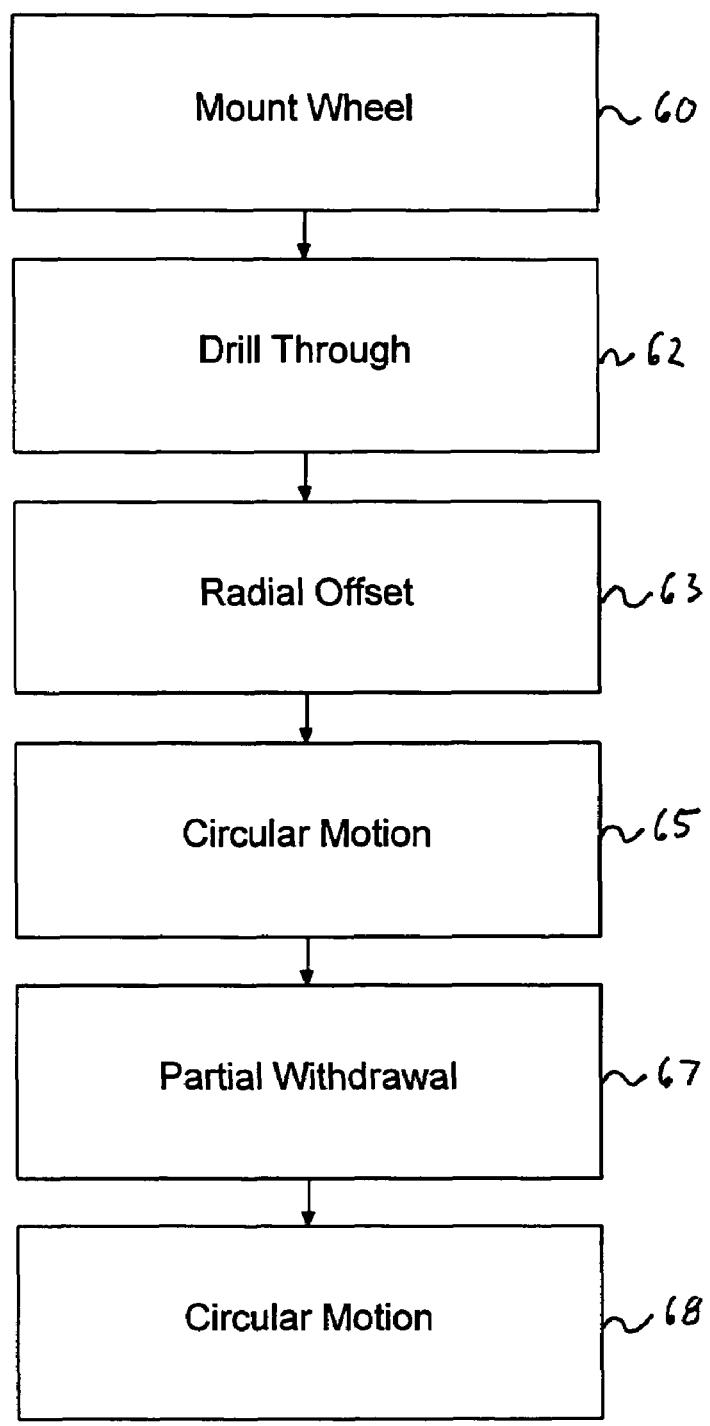
FIG. 5 is flow chart illustrating a method for forming a lug hole in accordance with the present invention and that utilizes the tool shown in FIG. 3.
Figure 6:
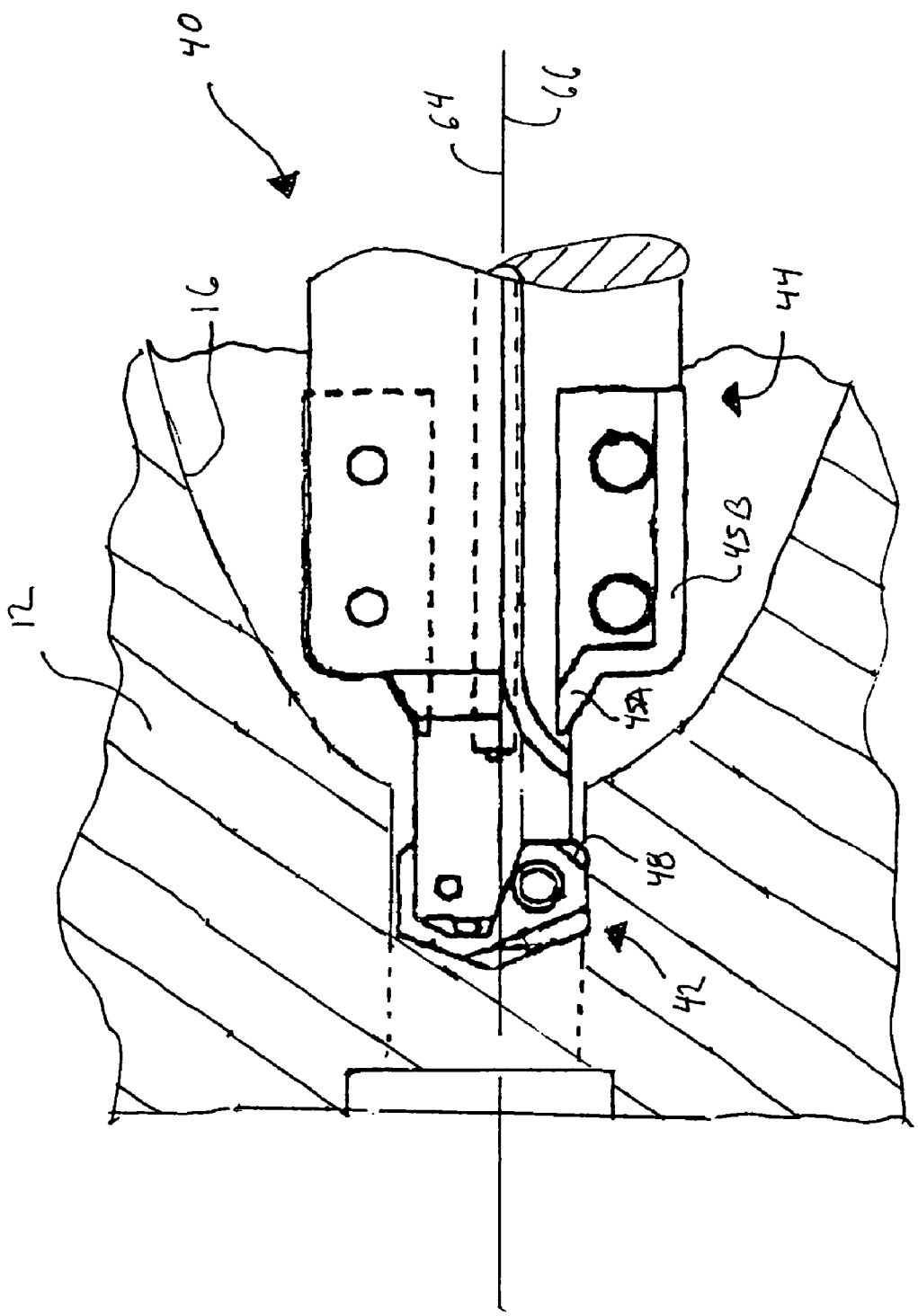
FIG. 6 is a sectional view of a portion of a vehicle wheel that illustrates initial drilling, part of the second step of the flow chart shown in FIG. 5.
Figure 7:
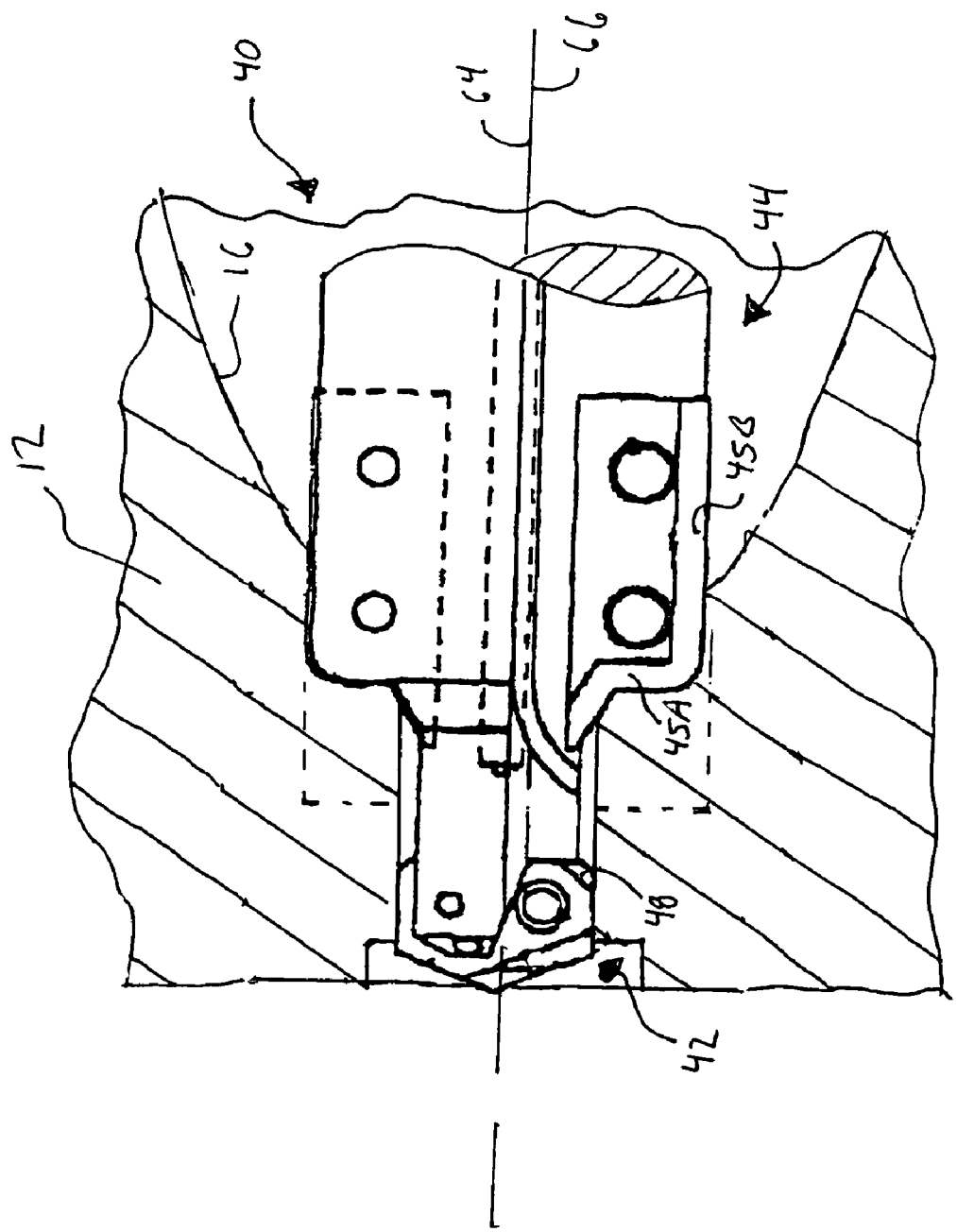
FIG. 7 is a sectional view of a portion of a vehicle wheel that illustrates further drilling and counterboring, part of the second step of the flow chart shown in FIG. 5.
Figure 8:
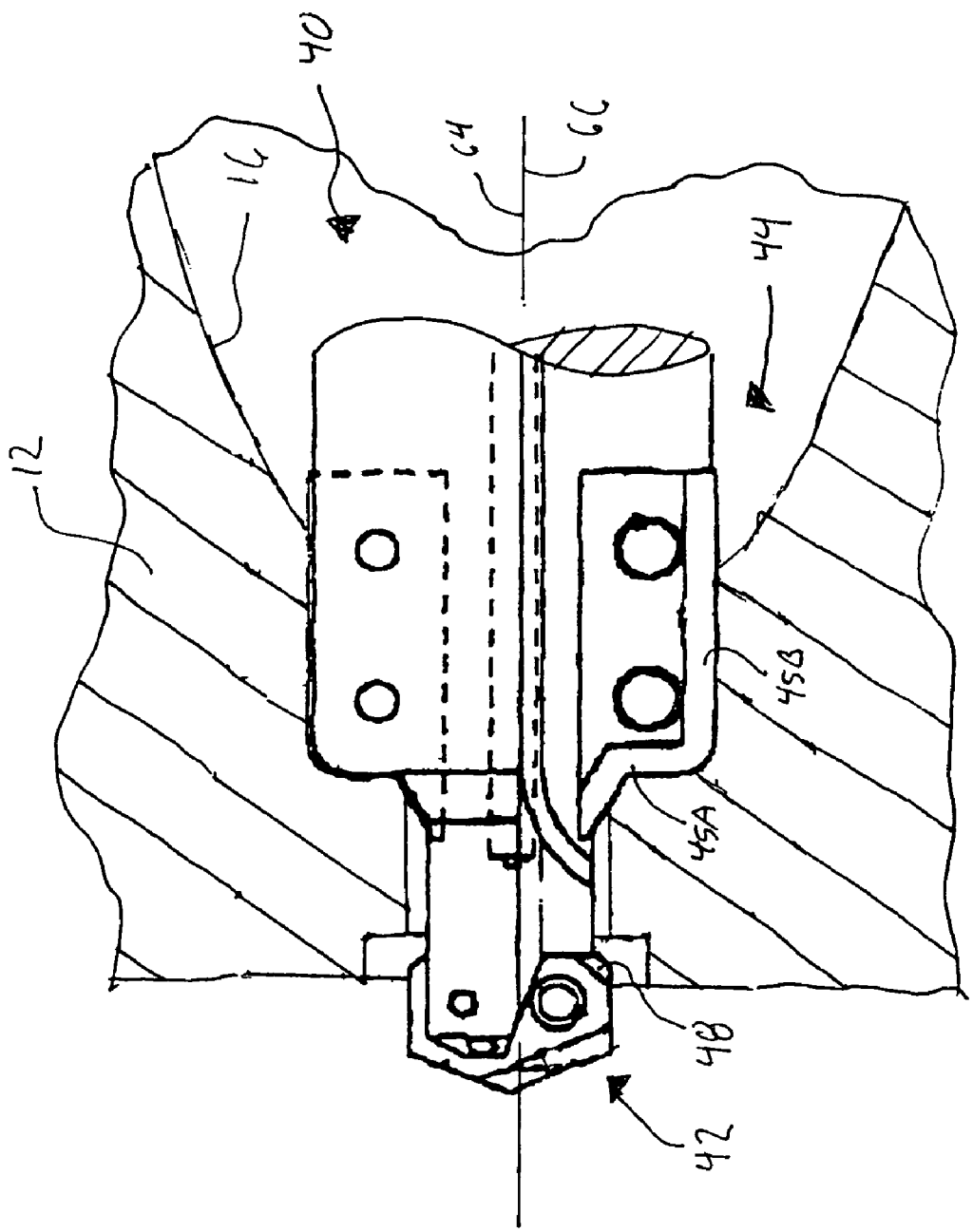
FIG. 8 is a sectional view of a portion of a vehicle wheel that illustrates final drilling and countersinking, part of the second step of the flow chart shown in FIG. 5.

The present invention also contemplates a method for using the tool 40 to form a complete lug hole 10. The method is shown by the flow chart shown in FIG. 5 and by a series of sectional views in FIGS. 6 through 10 that illustrate the formation of a lug hole in a vehicle wheel disc hub by the tool 40. The process begins in functional block 60 with the wheel being mounted upon a CNC machining station, or a wheel drilling machine with the outboard wheel surface adjacent to the tool 40. Then, in functional block 62, the spade drill bit 55 is used to drill a pilot hole completely through the wheel disc hub 12. The beginning of the drilling operation is illustrated in FIG. 6. As the tool 40 advances into the wheel disc hub 12, the pair of cutting tools 43 mounted upon the mid-portion 44 of the tool begin cutting the counterbore 22 and the tapered seat 26 for the lug nut, as illustrated in FIG. 7. As the tool 40 further advances into the wheel disc hub 12, the second and third cutting edges 45B and 45C finish the primary cut of a counterbore into the wheel disc hub 12. However, it is noted that the diameter of the counterbore cut by the tool 40 in functional block 62 is less than the final diameter of the lug hole counterbore 22. The completion of the initial drilling operation and initial counterbore cutting in functional block 62 is illustrated in FIG. 8, with the spade drill bit 55 extending through the wheel disc hub 12 and the depth of the counterbore 22 established by the cutting tools 43. As shown in FIGS. 6, 7, and 8, the centerline 64 of the lug hole coincides with the centerline 66 of the tool 40 during this initial operation.

Figure 9:
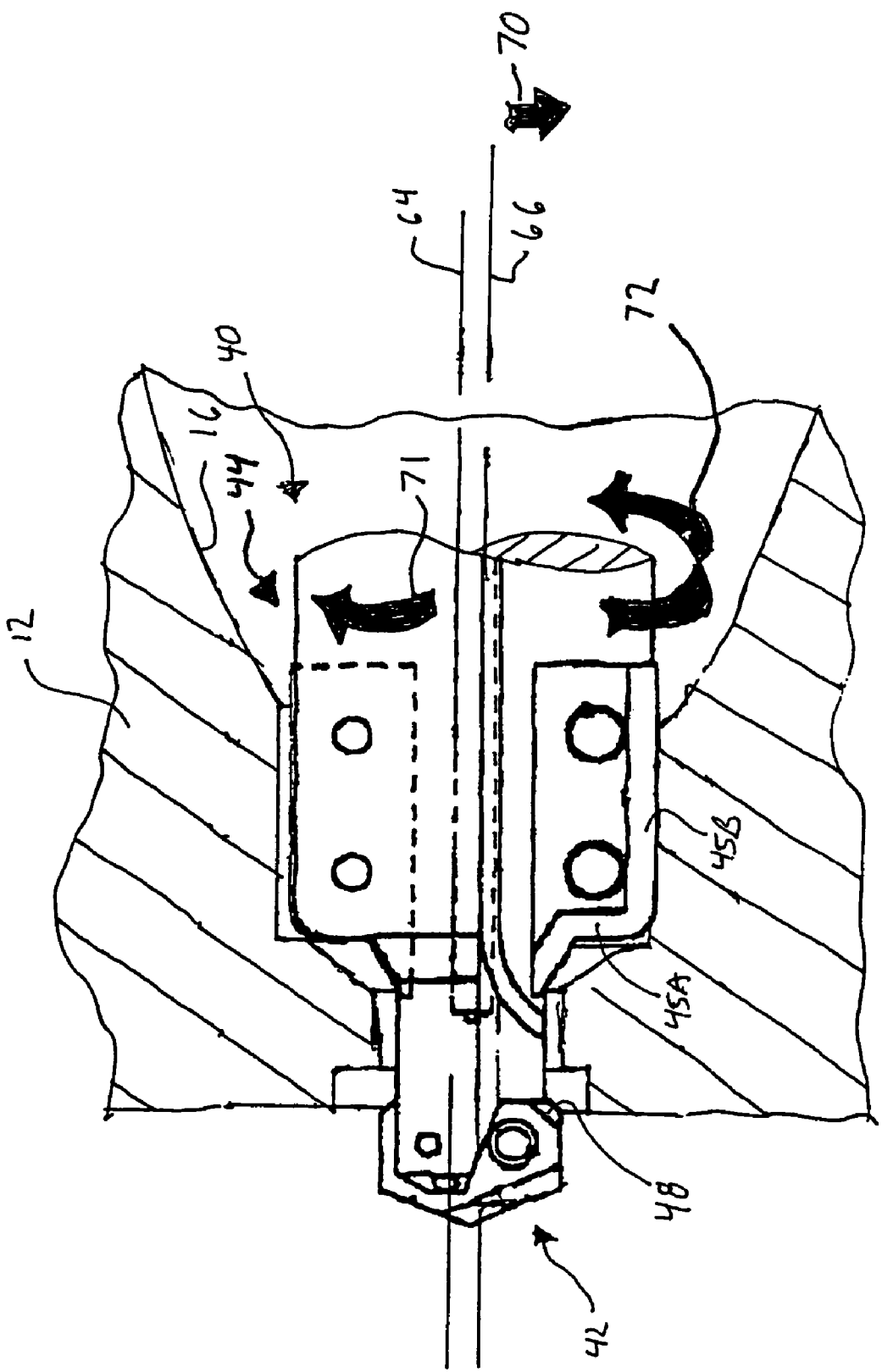
FIG. 9 is a sectional view of a portion of a vehicle wheel that illustrates polishing, the third and fourth steps of the flow chart shown in FIG. 5.

In functional 63, the tool 40 is moved in a radial direction, as shown by the arrow labeled 70 in FIG. 9, while being rotated. As the tool 40 moves in the radial direction, the second cutting edges 45B of the cutting tools 43 cut into the wall of the counterbore. The radial movement continues, producing a milling like operation that reams a portion of the counterbore 22 into the wheel disc hub 12 until the final radius of the counterbore 22 is reached. However, because the width of the spade bit 55 is greater than the diameter of the tool end, and the spade bit 55 extends beyond the lug hole land 28, no further material is removed from within the lug hole land 28. As also shown in FIG. 9, the radial movement of the tool 40 offsets the centerline 66 of the tool 40 radially from the centerline 64 of the pilot hole.

In functional block 65, the tool 40 continues to be rotated while also moving in a circular arc, opposite to the rotational direction of the tool 40, about a programmed radius, as illustrated in FIG. 9, where the rotation of the tool is identified by the arrow labeled 71, while the circular motion of the tool 40 is identified by the arrow labeled 72. This circular motion produces a climb cutting operation that first cuts into the side wall of the original counterbore to extend the diameter to a final size and then polishes the counterbore wall surface. Alternatively, the circular motion can be in the same direction as the rotation of the tool 40 to provide a convention cutting operation. At the same time, the first cutting edges 45A remove additional material form the outboard end of the lug hole land 28 to form the final shape and surface of the conical seat 26.

While the preferred embodiment had been described as offsetting the tool to final counterbore radius and then moving the rotating tool in a circular arc, it also contemplated that the invention may be practiced by moving the rotating tool in the circular arc while also moving the tool radially in a number of incremental steps. Thus, a small amount of material would be removed during each traversal of the counterbore. The radial movement could occur each time the same point of the circumference of the counterbore is reached or continuously as the tool moves through its arc. Alternatively, the tool 40 could be continuously moved in a radial direction as the tool 40 moves through the circular arc.

Figure 10:
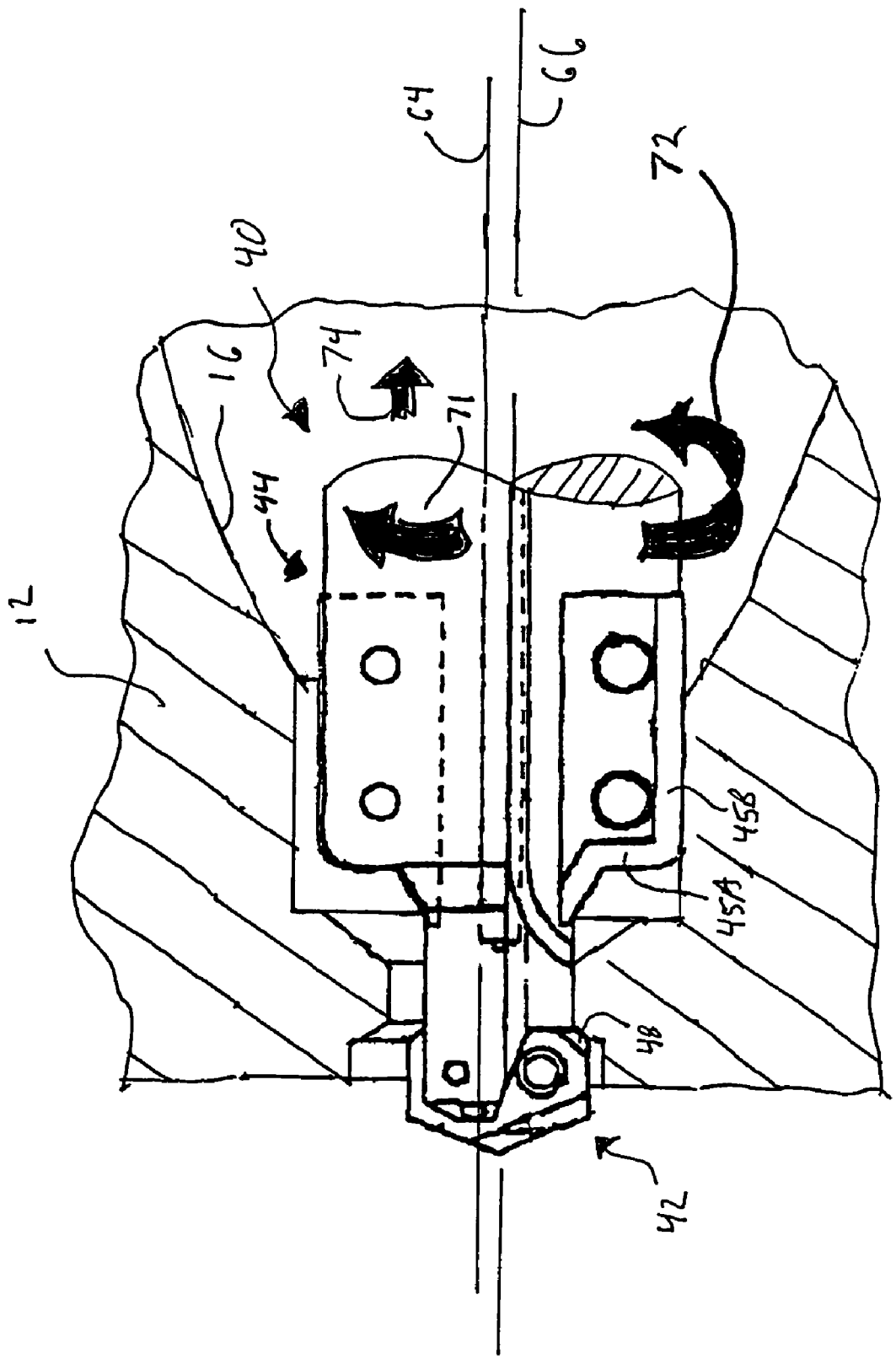
FIG. 10 is a sectional view of a portion of a vehicle wheel that illustrates chamfering, the fifth and sixth steps of the flow chart shown in FIG. 5.

In functional block 67, the tool 40 continues to rotate as it is partially withdrawn in an axial direction, as shown by the arrow labeled 74 in FIG. 10. As the tool 40 is redrawn, the chamfer cutting edges 48 formed on the reverse end of the spade drill bit 55 begin to remove material from the portion of the circular recess 20 that is adjacent to the inboard end of the lug hole land 28. If needed, the tool also may be moved radially inward toward the axis of the lug hole 10 to reduce the tool offset.

Finally, in functional block 68, the rotating tool 40 again travels about the circular arc, as illustrated in FIG. 10 by the arrow labeled 72. As before, the circular motion is preferably in the opposite direction as the rotation 71 of the tool 40, i.e. climb cutting. As the tool 40 moves, the chamfer cutting edge 48 formed on the reverse end of the spade drill bit 55 continues to cut into the inboard end of the lug hole land 28. This motion forms the chamfer cutting edge 48 to form the chamfer portion 24.

The offset radius in functional step 63 and the partial withdrawal in functional block 67 are controlled by programming the CNC machine. Selection of the offset radius determines the final diameter of the counterbore 22 and the selection of the partial withdrawal distance determines the size of the chamfer portion 24. Thus, the inventors contemplate that the same tool 40 may be utilized to form a plurality of lug holes having different internal shapes, for example, different diameter counterbores, conical seats, and chamfers. Additionally, the axial length of the lug hole land that receives the lug bolt is controlled, since the distance separating the chamfer portion 24 from the conic seat 26 is controlled by the shape of the tool 40 and amount of the partial withdrawal thereof.

While the preferred embodiment of the invention has been illustrated and described as having two cutting tools 43 mounted upon its mid-portion 44, it will be appreciated that the invention also may be practiced with a tool having a cutting assembly with three or more cutting tools (not shown) or even a single cutting tool (not shown).

The principle and mode of operation of this invention have been explained and illustrated in its preferred embodiment. However, it must be understood that this invention may be practiced otherwise than as specifically explained and illustrated without departing from its spirit or scope. For example, a larger spade drill bit can be fastened to the end portion of the tool to bore a larger diameter land.

What is claimed is:

1. A tool for forming a lug hole through the disc of a vehicle wheel comprising:
    a stepped cylindrical base that includes an end portion having a first diameter and a mid-portion having a second diameter that is greater than said first diameter;
    a spade drill bit mounted upon said end portion, said spade drill bit having a width that is greater than said first diameter, said spade drill bit also including at least one chamfer cutting portion formed upon a reverse end thereof, said chamfer cutting portion extending in a radial direction beyond the surface of said end portion; and
    at least one counter bore cutting tool mounted upon said mid-portion of said base, said counter bore cutting tool operable to form a cylindrical counter bore in a workpiece.

2. The tool according to claim 1 wherein said bore cutting tool also includes a conical seat cutting portion formed upon an end thereof.

3. The tool according to claim 2 wherein said bore cutting tool includes a bore cutting surface that is generally parallel to an axis of the tool and further wherein said mid-portion of said tool base includes at least one recess formed therein that corresponds to said bore cutting tool, said bore cutting tool being mounted within said recess with said bore cutting surface and said conical seat cutting portion extending beyond said recess.

4. The tool according to claim 3 wherein said spade bit includes a cutting surface forming an angle within the range of 130 to 140 degrees with said tool axis.

5. The tool according to claim 3 wherein said spade bit is removably mounted upon said end portion of said tool base.

6. The tool according to claim 3 wherein said bore cutting tool is removably mounted within said recess.

7. A method for forming a lug hole through the disc of a vehicle wheel comprising the steps of:
    (a) providing a tool having an end portion carrying a spade drill bit, the spade drill bit including at least one chamfer cutting portion formed upon a reverse end thereof, and having a mid-portion carrying a counter bore cutting tool, the mid-portion having a larger diameter than the end portion;
    (b) drilling a pilot hole through a wheel disc hub with the spade drill bit, the bore cutting tool carried upon the mid-portion of the tool forming a counterbore in one end of the pilot hole;
    (c) rotating and moving the tool in a radial direction within the pilot hole; and
    (d) rotating and moving the tool in a circular arc to increase the diameter of the counterbore.

8. The method of claim 7 wherein the rotation and circular movement of the tool in step (c) are in opposite directions.

9. The method of claim 8, wherein the method further includes, subsequent to step (d), rotating and partially withdrawing the tool to form a chamfer upon the end of the pilot hole.

10. The method of claim 7 wherein the rotation and circular movement of the tool in step (c) are in the same direction.

11. A method for forming a lug hole through the disc of a vehicle wheel comprising the steps of:
 (a) providing a tool having an end portion carrying a spade drill bit, the spade drill bit includes at least one chamfer cutting portion formed upon a reverse end thereof, and having a mid-portion carrying a counter bore cutting tool, the mid-portion having a larger diameter than the end portion;
 (b) drilling a pilot hole through a wheel disc hub with the spade drill bit, the bore cutting tool carried upon the mid-portion of the tool forming a counterbore in one end of the pilot hole;
 (c) rotating and moving the tool in a circular arc within the pilot hole; and
 (d) moving the tool in a radial direction to increase the diameter of the counterbore, while continuing to rotate and move the tool in a circular arc.

12. The method of claim 11 wherein the rotation and circular movement of the tool in step (c) are in opposite directions.

13. The method of claim 12 wherein the method further includes, subsequent to step (d), rotating and partially withdrawing the tool to form a chamfer upon the end of the pilot hole.

14. The method of claim 11 wherein the rotation and circular movement of the tool in step (c) are in the same direction.

* * * * *